(12) United States Patent
Arrakoski

(10) Patent No.: US 7,769,041 B2
(45) Date of Patent: Aug. 3, 2010

(54) SCHEDULING OF TRANSFERS IN A COMMUNICATIONS NETWORK

(76) Inventor: Jori Arrakoski, Henttaankallio 1-3, FIN-02200 Espoo (FI)

( * ) Notice: Subject to any disclaimer, the term of this patent is extended or adjusted under 35 U.S.C. 154(b) by 1626 days.

(21) Appl. No.: 10/415,372

(22) PCT Filed: Oct. 26, 2001

(86) PCT No.: PCT/FI01/00934

§ 371 (c)(1), (2), (4) Date: Aug. 25, 2003

(87) PCT Pub. No.: WO02/37752

PCT Pub. Date: May 10, 2002

(65) Prior Publication Data

US 2004/0047293 A1 Mar. 11, 2004

(30) Foreign Application Priority Data

Oct. 30, 2000 (FI) .................................. 20002387

(51) Int. Cl.
*H04B 7/212* (2006.01)
(52) U.S. Cl. ...................................... 370/442; 370/337
(58) Field of Classification Search ................ 370/329, 370/346, 348, 351, 353, 395.31, 450, 452, 370/229, 230, 235, 280, 238, 294, 321, 347, 370/395.4, 442; 455/12.1, 522
See application file for complete search history.

(56) References Cited

U.S. PATENT DOCUMENTS

| | | | | |
|---|---|---|---|---|
| 4,878,219 A | * | 10/1989 | Kaufman et al. ............ | 370/452 |
| 5,229,993 A | | 7/1993 | Foudriat et al. | |
| 5,297,144 A | * | 3/1994 | Gilbert et al. .............. | 370/346 |
| 5,416,780 A | * | 5/1995 | Patel ........................ | 370/347 |
| 5,613,198 A | * | 3/1997 | Ahmadi et al. ............. | 370/337 |
| 5,828,656 A | * | 10/1998 | Sato et al. ................. | 370/254 |

(Continued)

FOREIGN PATENT DOCUMENTS

WO    WO 98/35514    8/1998

(Continued)

OTHER PUBLICATIONS

"Distributed Multi-Hop Scheduling and Medium Access with Delay and Throughput Constraints", Kanodia et al, Proc. of ACM MOBICOM 2001.

*Primary Examiner*—Ricky Ngo
*Assistant Examiner*—Kan Yuen

(57) ABSTRACT

The invention relates to the scheduling of data transfers in a multi-hop packet network. The nodes of the network are adapted to schedule their transmissions according to a common time sequence, recurring in time domain and comprising a control portion for transmission of at least one control packet and a data portion for transmission of data packets. In order to accomplish a simple and controlled way for minimizing delay and delay variation, the network is classified into several levels with respect to a certain node, each level comprising the nodes located at the same distance from said certain node, measured in number of hops along the shortest path in the network. The data portion is further divided into successive reservation periods, each being allocated to transmissions of delay sensitive traffic through the hops between two predetermined neighboring levels so that a data packet can be transferred across the network within a single time sequence.

23 Claims, 3 Drawing Sheets

U.S. PATENT DOCUMENTS

| | | | | |
|---|---|---|---|---|
| 5,838,674 | A * | 11/1998 | Forssen et al. | 370/337 |
| 5,838,696 | A * | 11/1998 | Mons | 714/763 |
| 5,982,780 | A * | 11/1999 | Bohm et al. | 370/450 |
| 6,130,881 | A * | 10/2000 | Stiller et al. | 370/238 |
| 6,236,656 | B1 * | 5/2001 | Westerberg et al. | 370/395.4 |
| 6,246,713 | B1 * | 6/2001 | Mattisson | 375/132 |
| 6,389,010 | B1 * | 5/2002 | Kubler et al. | 370/353 |
| 6,614,778 | B1 * | 9/2003 | Hwang | 370/348 |
| 6,697,334 | B1 * | 2/2004 | Klincewicz et al. | 370/238 |
| 6,721,290 | B1 * | 4/2004 | Kondylis et al. | 370/329 |
| 6,735,178 | B1 * | 5/2004 | Srivastava et al. | 370/252 |
| 6,748,233 | B1 * | 6/2004 | Arnold et al. | 455/522 |
| 6,788,702 | B1 * | 9/2004 | Garcia-Luna-Aceves et al. | 370/458 |
| 6,810,038 | B1 * | 10/2004 | Isoyama et al. | 370/395.42 |
| 6,904,110 | B2 * | 6/2005 | Trans et al. | 375/350 |
| 6,928,061 | B1 * | 8/2005 | Garcia-Luna-Aceves et al. | 370/329 |
| 6,965,582 | B1 * | 11/2005 | Moulsley | 370/329 |
| 6,973,089 | B1 * | 12/2005 | Linsky et al. | 370/395.31 |
| 7,002,949 | B2 * | 2/2006 | Garcia-Luna-Aceves et al. | 370/351 |
| 7,054,293 | B2 * | 5/2006 | Tiedemann et al. | 370/335 |
| 7,068,974 | B1 * | 6/2006 | Linsky et al. | 455/12.1 |
| 2001/0012280 | A1 * | 8/2001 | Dent | 370/335 |
| 2002/0067736 | A1 * | 6/2002 | Garcia-Luna-Aceves et al. | 370/442 |
| 2002/0167918 | A1 * | 11/2002 | Brewer | 370/324 |
| 2003/0063583 | A1 * | 4/2003 | Padovani et al. | 370/329 |
| 2006/0007883 | A1 * | 1/2006 | Tong et al. | 370/328 |

FOREIGN PATENT DOCUMENTS

| | | |
|---|---|---|
| WO | WO 99/00931 | 1/1999 |
| WO | WO 00/19672 | 4/2000 |
| WO | WO 00/48367 | 8/2000 |

* cited by examiner

SCHEDULING OF TRANSFERS IN A COMMUNICATIONS NETWORK

FIELD OF THE INVENTION

The invention relates generally to media access control in a communications network. More particularly, the invention relates to the scheduling of transfers in a synchronized multi-hop packet network, especially in a mesh network, and it is intended for traffic which is sensitive to delay or delay variation. This type of traffic is typically generated by interactive and/or real-time services.

BACKGROUND OF THE INVENTION

In packet-switched networks, the packets serving the information transfer utilize the same communication resources, which can transmit a single packet at a time. As a result, the packets must queue for their allocated transmission position in the packet transmission sequence, which causes transmission delay.

In a multi-hop packet network a packet typically travels from the source node to the destination node via one or more other nodes, since the source and destination nodes are normally not adjacent nodes in the network and therefore direct communication between said nodes is not possible. Since every additional hop (i.e. transmission path between adjacent nodes) generates a transmission delay equal to at least one frame, the delay accumulates considerably in a multi-hop network.

In a synchronized packet network the nodes agree on how time is divided into "slots" and how the slots are grouped into "frames". FIG. 1 illustrates these basic concepts of a synchronized network. In a typical synchronized network, the nodes share a common time sequence, such as a frame, that repeats regularly in the time domain. A single frame contains a predetermined number of time slots, which are divided between control (i.e. signaling) information and user data, the division being typically such that a certain predefined number of time slots, such as 10% of a frame time, is devoted to control packet transmission and the rest to data packet transmission. The length of a packet as compared to a time slot may vary in various systems.

A synchronized multi-hop packet network of the above kind is depicted for example in the PCT application WO 00/48367.

In this type of a network, a node and its neighboring nodes form a neighborhood. Thus, there are as many neighborhoods as there are nodes, although the neighborhoods overlap to a great extent. In the control portion of a frame a node agrees about the time slot reservations with all the nodes within its neighborhood. Each time slot in the control portion of a frame is typically allocated to a single node. In this time slot the node sends control packets including scheduling information, i.e. this information indicates how the node is scheduled to transmit and/or receive during the subsequent frames. Thus, in the control part scheduling for data packets in the current frame and in the consecutive frames is agreed upon among the nodes in the neighborhood.

When a packet starts its travel over the network, it will normally be scheduled to the first available free time slot in the neighborhood of the transmitting node. When the receiving node receives the packet, it will do the corresponding reservation in its own neighborhood. Since these reservations involve negotiations between the nodes, it is apparent that normal reservations on a packet-by-packet basis are not sufficient to meet the delay requirements for real-time and interactive services.

In order to support these services, persistent reservations have been introduced into the network. Persistent reservations are time slot reservations made for a longer period, and these persistent time slots are used to accommodate delay sensitive traffic, such as traffic generated by real-time or interactive services. Thus, persistent flows are chosen to convey delay sensitive traffic. Persistent flows are used in the above-mentioned PCT application, for example.

However, a drawback relating to the present networks is that they do not provide a controlled way for minimizing delay or delay variation, but the performance of the system is more or less coincidental in view of delay and delay variation. Thus, the persistent time slots cannot guarantee a good performance in terms of transmission delay.

A conventional method for decreasing the delay in multi-hop networks is to reduce the frame size in order to shorten the buffering time in a node. However, there is a minimum for the frame length, as signalling overhead becomes dominant when the frame length is reduced. In other words, the proportion of signalling information of the total transmission capacity becomes too high if the frame length is not above a certain minimum value. Further, the implementation constraints, such as the processing power available in a node, will simply define the minimum frame size that can be processed in real-time. Thus, the shorter the frames are, the higher is the processing power requirement in individual nodes. This drawback also relates to the number of time slots in a frame; if a certain number of time slots is required in the frame, the minimum length of a time slot which can still be processed sets a limit below which the frame length cannot go.

The objective of the present invention is to obtain a solution by means of which the above-mentioned drawbacks relating to short frames can be eliminated, and to bring about a scheme, which enables a simple and controlled way for minimizing delay and delay variation in multi-hop packet networks.

SUMMARY OF THE INVENTION

The objective of the present invention is to bring about a scheduling method which enables effective delay control and minimization in synchronized multi-hop packet networks.

This objective is achieved with the solution defined in the independent patent claims.

It is to be noted that the present invention provides a network wide scheduling method for such traffic, which is sensitive to delay and/or to delay variation. Other traffic is processed in a known manner, i.e. traffic, which does not belong to this category is transmitted in a known manner according to the capacity available at each time. The solution is primarily intended for delay sensitive traffic, but since the correct operation of the method results in practically constant transmission delay, it is also suitable for traffic, which is sensitive to delay variation.

In a synchronized packet network all the nodes are synchronized to a common time sequence, which recurs in time domain and includes transmission periods for both control information and (user) data. The idea according to the invention is to introduce transmission periods (which are also called reservation periods) into the time sequence so that a data packet can be transferred across the network within a single time sequence. For this purpose, the nodes of the network (or the hops between the nodes) are grouped into several groups according to their location in the network, the data portion of the time sequence is divided into successive reservation periods allocated to the groups, and the groups and the reservation periods are associated with each other so that the position of an individual reservation period within the time sequence depends on the location of the corresponding group(s) within the network.

In a preferred embodiment of the invention, the data portion is divided into successive reservation periods for two transmission directions so that the reservation periods of both transmission directions occur simultaneously.

In a further preferred embodiment the time sequence is covered by a single frame and the data portion of the frame is divided into reservation periods of unequal lengths, the length of each period being inversely proportional to the distance at which the group(s) is/are from a certain center node relaying the largest amount of traffic.

The scheduling method according to the invention offers a simple way of minimizing the delay and delay variation, and therefore applications whose delay requirements have been difficult to support in (complex) mesh networks can now be made available in these networks.

BRIEF DESCRIPTION OF THE DRAWINGS

In the following, the invention and its preferred embodiments are described more closely referring to the examples shown in FIGS. 1 to 5 in the appended drawings, wherein.

DETAILED DESCRIPTION OF THE INVENTION

As discussed above, the present invention is applicable in a synchronized multi-hop network, i.e. in a network implemented with similar devices utilizing the same MAC (Media Access Control) frames. In view of the invention, a prerequisite for the system is that it provides a time sequence, which recurs in the time domain and in which time is allocated for the transmission of both control and data packets. As shown below, the time sequence can consist of one or more frames. The time sequence typically repeats itself at regular intervals.

Figure 1:
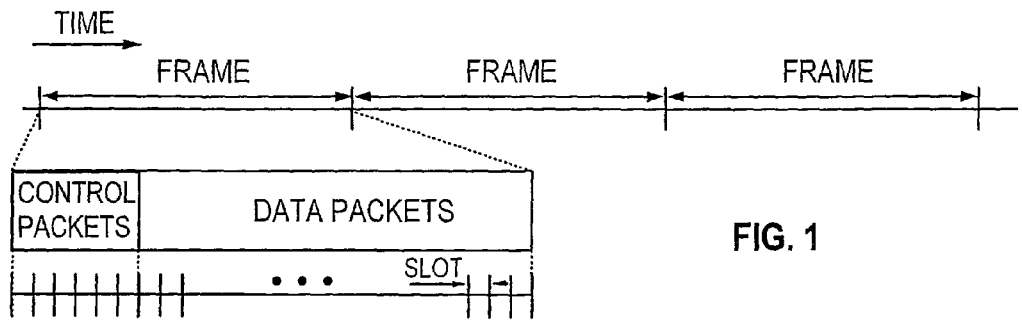
FIG. 1 illustrates the time sequence methodology obeyed in a synchronized packet network.
Figure 2:
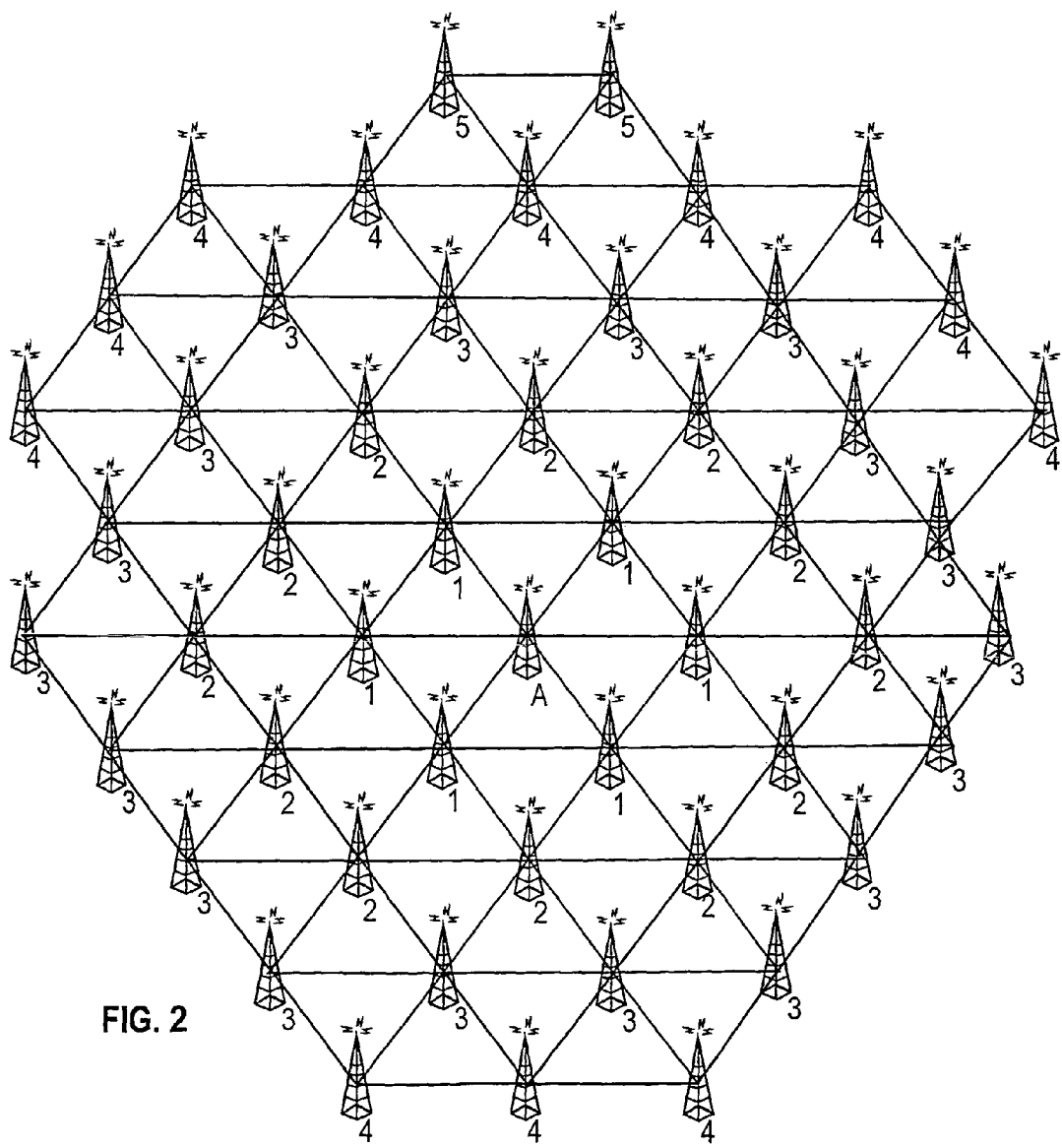
FIG. 2 illustrates an example of a mesh network in which the invention is implemented.

The scheduling scheme of the present invention is now explained with reference to the example of FIG. 2 illustrating a mesh network where each node has in general 6 neighbors. It is assumed here that the network is connected to a backbone network through node A in the center of the figure, i.e. node A operates as a sink node in the network. There can be several sink nodes in the network and they can be arbitrarily placed in the network. However, this does not affect the principle according to the invention, which remains the same regardless of the number and location of the sink nodes. For the sake of simplicity, the center node approach is chosen in this context.

The distance from the center node to another node is measured as the number of hops required to reach said node from the center node. In FIG. 2, the number associated with each node (except the center node) indicates the distance in hops from the center node to the node along the shortest path. Thus, in the example of FIG. 2 there are 6 nodes which are at the distance of one hop from the center node, 12 nodes which are at the distance of 2 hops from the center node, 18 nodes, which are at the distance of 3 hops from the center node, etc. It is to be noted that there are several shortest paths available, and thus the intrinsic redundancy of a mesh network is still preserved, even though a huge amount of possible paths are discarded due to more hops than the optimal number of hops.

Figure 3:
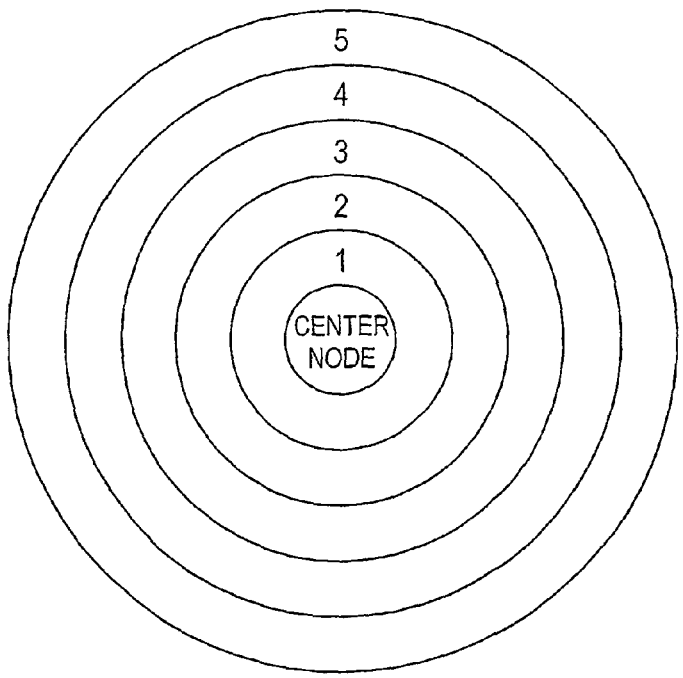
FIG. 3 illustrates a simplistic model of the network of FIG. 2.

FIG. 3 illustrates a more simplistic model of the network of FIG. 2. Each ring in the figure represents the nodes which are at the distance of n (n=1,2, . . . ,5) hops from the sink node, the values of n being shown in the figure. In a network according to FIGS. 2 and 3, the traffic tends to flow inwards and outwards through the sink node. Obviously there is other traffic in the network too, but in general the majority of applications lay in the network behind the sink node. This is the situation in many networks, for example in access networks.

Assuming an even load (although this worst case is extremely improbable in reality), the traffic capacity would aggregate around the sink node. If it is further assumed that the network is a fully populated 8-neighbor mesh (where each node has 8 neighbours), it can be shown that the amount of traffic relayed further by each node in an inner circle is:

$$T_{out}(i) = T_{node}\left(1 + \sum_{k=1}^{i} 1.5^k\right), \quad (1)$$

where $T_{node}$ is the average traffic generated by a node and i is the number of levels outside the particular node's level.

Similar calculations can be made to any type of mesh topology, the common element being the concentration of traffic around the sink node.

Thus, in a real network the capacity issue is accentuated around the sink node. Increasing capacity will usually decrease the delay. This is especially true, if congestion occurs. However, congestion in a mesh network should be avoided by any means. If throughput cannot be increased, the only way to improve performance and to decrease delay is a more sophisticated traffic flow. The present invention provides a solution for this flow, as discussed below.

Figure 4:
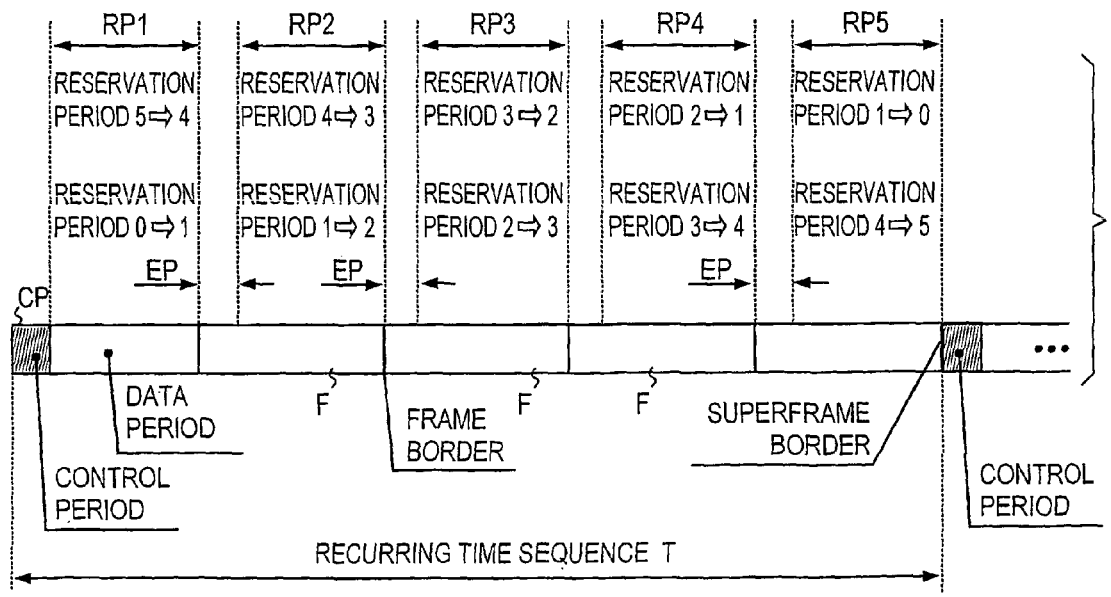
FIG. 4 illustrates the reservation scheme according to the invention in a multi-frame system.

FIG. 4 illustrates the first embodiment of the invention, intended for a multi-frame system, i.e. for a system where the time sequence T which recurs in a similar format and includes transmission periods for both control and data packets, contains a plurality of frames. The frames F are relatively short as compared to the length of the time sequence T. Although the example of FIG. 4 relates to a five level mesh according to FIGS. 2 and 3, it is applicable to any other number of levels.

In this first embodiment part of the frames include both signaling (i.e. control) information and data, whereas the other frames include only data. Preferably, as also in this example, one out of N frames includes a control period (control packets), N being the number of levels outside the center node. The data portion within the time sequence T is divided into several reservation periods, each period being allocated to transmission from a certain level to the neighboring level in accordance with the location of said levels in the network. As to the traffic in the downlink direction (outwards from the center node) the first reservation period RP1 is scheduled (reserved) for delay sensitive traffic from the center node to the nodes on the first level, the second reservation period RP2 is scheduled for delay sensitive traffic from the first level to the second level, etc, and the fifth reservation period RP5 is reserved for the delay sensitive traffic from the fourth level to the fifth level.

The length of a reservation period corresponds otherwise to the length of a frame (or the data period within a frame with a control period), except that there is an empty period EP between two successive reservation periods in order to ensure enough processing time for the packets. In practice, the length of each empty period can be of the order of one slot, provided that the length of the slot has been specified so that it can accommodate a packet of minimum length (i.e. the shortest possible burst).

Each reservation period is also allocated to traffic in the uplink direction (towards the center node). However, in this case the reservation order is the opposite; the first reservation period is scheduled for delay sensitive traffic from the fifth to the fourth level, the second reservation period for delay sensitive traffic from the fourth to the third level, etc, and the fifth reservation period is reserved for the delay sensitive traffic from the first level to the center node. Thus, an uplink reservation scheme is used simultaneously with a downlink reservation scheme.

The reservation periods are preferably further divided into time slots and the scheduling of the time slots of each reservation period is negotiated among the nodes in the neighborhood, utilizing the control period.

Figure 5:
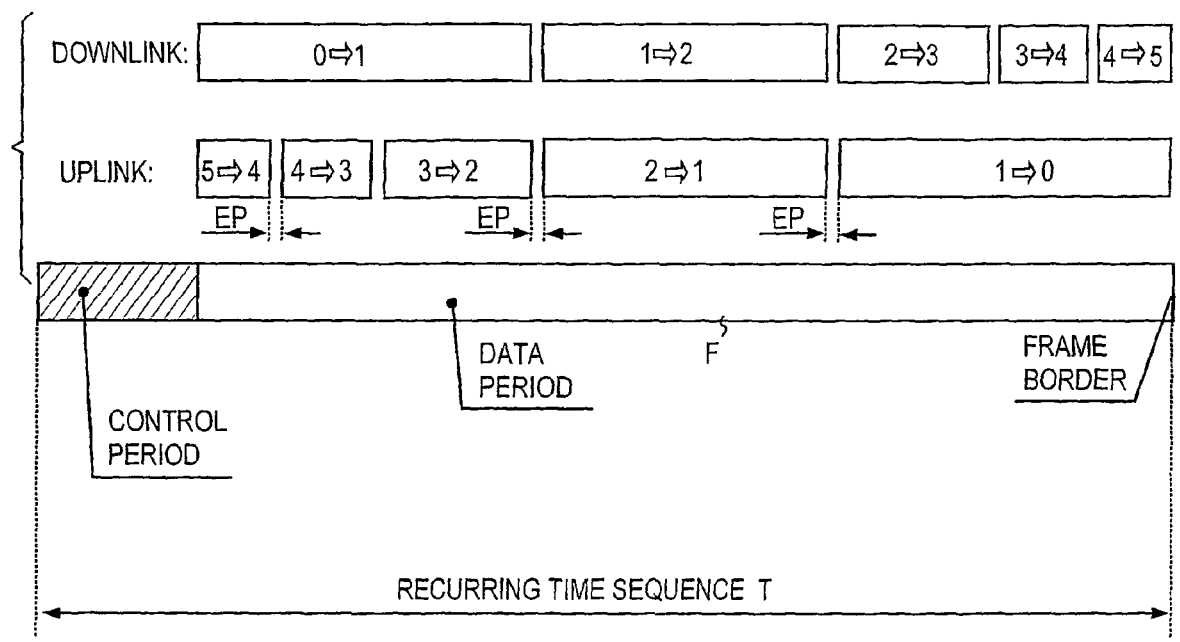
FIG. 5 illustrates the reservation scheme according to the invention in a single frame system.

FIG. 5 illustrates the second embodiment of the invention, which is intended for a single frame system, i.e. for a system where the time sequence T contains only one frame. In this frame, sections are also reserved in a way that enables relaying the data several times during the same frame, preferably from the center node to the outermost level, or vice versa. As above, the uplink reservation scheme is used simultaneously with the downlink reservation scheme.

As in the first embodiment, the data portion within the time sequence T is divided into several reservation periods, each period being allocated to transmission from a certain level to the neighboring level in accordance with the location of the connecting hop in the network. However, in this case the amount of time scheduled to the traffic of a certain hop depends on the hop in question, and the reservation periods are therefore separate in each transmission direction. The closer the hop is to the center node the more time is scheduled for the traffic. In this example ⅓ of the data portion is allocated to the traffic of the center node in each transmission direction. This means that up to ⅔ of the traffic through the center node can be delay sensitive.

The second embodiment is preferable in the sense that it enables more flexibility in distributing the reservation slots according to the network structure and traffic needs, especially in view of the traffic concentration around the center node.

It is to be noted that during the reservation periods 0→1 and 1→0 the center node is always involved in the transmission. During the other reservation periods an arbitrary number of the nodes on the associated levels can transmit or receive. These transmissions can be simultaneous if they can be separated from each other, i.e. it is not necessary to use time division within a reservation period, if there are means for separating simultaneous transmissions from each other.

Although the reservation periods 1→2 and 2→1 are simultaneous in the example of FIG. 5, the transmissions do not necessarily interfere with each other, even though they are simultaneous. This is because the nodes on levels 1 and 2 are already located in a rather large area and the number of possible hops between these levels is also large.

As to all traffic relayed in the network, two types of reservations can be made, persistent reservations and normal reservations. Persistent reservations are preferable for the delay sensitive traffic, and thus they are the above-described reservations. Persistent reservations are based on an estimate of the incoming data and they are made for a longer period of time. Due to the uncertaintity in filling up the persistent reservations, it is preferable to avoid excessive persistent reservations to ensure maximum available capacity. Normal reservations, in turn, are made for a known amount of data for a known period, and they are preferably made for normal traffic., which is not sensitive to delay (or delay variation).

All available slots are not always filled with delay sensitive traffic. Thus, these empty slots can be filled with normal traffic which is not sensitive to delay. This applies to any free slot in the scheme.

As mentioned above, a node and its neighboring nodes form a neighborhood. Thus, a node on level i has neighbors on levels i−1, i, and i+1, except the center node or the nodes on the outermost level. Regarding the traffic which is not scheduled according to the invention, a node agrees about the reservations with all the nodes within its neighborhood.

Since the MAC functions are performed on layers above the physical layer, the scheduling method according to the invention is not tied to any physical technology and therefore the underlaying physical layer can be implemented by many technologies used at present or in the future. The hops, for example, can be wireless or wireline connections. In communications by radio, different transmissions must be separated from each other in order that they do not cause excessive interference with each other. This separation can be performed by frequency, time, space, code or any combination of these. Thus, the time sequences or frames are multi-dimensional in the sense that in the first dimension the separation of the transmissions is based on time (separate reservation periods), while in the other dimensions the separation can be based on time (time slots within the reservation periods), frequency, space or code, or to any combination of these. In the network of FIGS. 2 and 3, for example, the nodes on the outermost level can be geographically rather far away from each other and may therefore be able to re-use the same resource (such as a frequency). Thus, in this case space is the factor, which can separate the transmissions, even though they are simultaneous. Even a short reservation period (such as reservation periods 4→5 and 5→4 in FIG. 5) may therefore be quite sufficient, especially if simultaneous transmissions can be used within said reservation period.

However, it is to be noted that during the control periods the separation can only be made between neighborhoods with no connection, since all nodes within a single neighborhood should receive the same messages. During the data portion, the traffic is more node-to-node-related, and in this case more separate communication channels are available.

The invention is applicable to any multi-hop network utilizing the same MAC frame or time sequence. However, the scheme is especially powerful in wireless mesh applications. These are mostly fixed broadband access or transmission networks, but the invention is also applicable to moving ad-hoc networks. However, these moving networks require that the scheme is adaptive and the reservation periods can be altered during the operation of the network according to the changes in the topology of the network. This adaptability can also be used for improving the performance if the network capacity is not fully utilized or the load is non-uniformly distributed in the network.

In some systems, especially in systems where the scheduling information is static, it may be adequate that the control data comprises only a predefined delimiter between the sequences. Thus in systems like this the control data portion reduces to such a delimiter indicating a boundary between two successive sequences.

The common time sequencing can also be implemented using variable length time sequencies, i.e. the length of the common time sequence can vary on a sequence-basis, provided that the nodes know the start and end points of each sequence and can adapt to this variation.

Although the invention was described above with reference to the examples shown in the appended drawings, it is obvious that the invention is not limited to these, but that it may be modified by those skilled in the art without departing from the scope and spirit of the invention. For example, the solution according to the invention can be applied on a certain part of the network only. The term "network" therefore also covers a sub-network of a larger network. The invention can also be implemented in many ways within a single network. For example, different parts of a network can have different time sequences, with different scheduling schemes. Furthermore, the time sequence used in the network (or in a sub-network) can include several separate control and/or data periods.

The invention claimed is:

1. A method of scheduling data transfers in a multi-hop packet network including a plurality of interconnected nodes configured to schedule their transmissions through said one or more hops, the method comprising:
   associating each node of a plurality of nodes in a multi-hop packet network with a level of a plurality of levels, wherein the level associated with each node reflects a number of hops from a first node to said each node, the number of hops measured along a shortest path between the first node and said each node in the network;
   dividing a data portion of a transmission into a plurality of reservation periods, the transmission comprising a control portion reserved for transmission of at least one control packet and the data portion reserved for transmission of data packets; and
   allocating each reservation period of the plurality of reservation periods for transmissions of delay sensitive traffic between neighboring nodes having the same associated levels of the plurality of levels,
   wherein the transmissions include a first transmission between first neighboring levels in an uplink direction and a second transmission between second neighboring levels in a downlink direction, wherein the uplink direction is toward the first node and the downlink direction is outward from the first node.

2. A method according to claim 1 wherein the reservation periods occur simultaneously in both transmission directions.

3. A method according to claim 2, wherein said dividing includes leaving an empty period between two successive reservation periods.

4. A method according to claim 1, wherein the allocation of the plurality of reservation periods occurs during a single frame.

5. A method according to claim 4, further comprising dividing said data portion into reservation periods of unequal lengths, the length of each reservation period being inversely proportional to the number of hops from said first node.

6. A method according to claim 5, further comprising allocating at least one third of the data portion to delay sensitive traffic of a center node in each transmission direction.

7. A method according to claim 1, comprising dividing a time sequence into a plurality of frames, wherein each frame of the plurality of frames includes at least one reservation period.

8. A method according to claim 1, comprising scheduling other traffic than said delay sensitive traffic in any reservation period having free capacity.

9. A method according to claim 1, comprising changing the lengths of the reservation periods.

10. A method according to claim 1, wherein said control portion includes a predefined delimiter indicating a boundary between two successive time sequences.

11. A method according to claim 1, wherein the transmissions include a first transmission between first immediate neighboring levels in a first direction and a second transmission between second immediate neighboring levels in a second direction, and wherein the number of hops between the first immediate neighboring levels is greater than or equal to the number of hops between the second immediate neighboring levels.

12. A method according to claim 1, wherein the multi-hop network is a mesh network.

13. A method according to claim 12, wherein the mesh network is a wireless mesh network.

14. A multi-hop packet network comprising
   a plurality of interconnected nodes, wherein each node is connected to each other node through one or more hops and is configured to schedule a transmission through said one or more hops, the transmission comprising a control portion reserved for transmission of at least one control packet and a data portion reserved for transmission of data packets,
   wherein the plurality of nodes are divided into a plurality of levels with respect to a first node, each level comprising the nodes located a same number of hops from said first node, the number of hops measured along a shortest path in the network between said first node and said each node, and
   further wherein each node of the plurality of nodes is scheduled to transmit delay sensitive traffic within a period whose location within the data portion depends at least on the levels between which the delay sensitive traffic is to be transmitted,
   wherein each period includes a first transmission between first neighboring levels in an uplink direction and a second transmission between second neighboring levels in a downlink direction, wherein the uplink direction is toward the first node and the downlink direction is outward from the first node.

15. A multi-hop packet network according to claim 14, wherein at least part of the nodes are connected to another network through said first node.

16. A multi-hop packet network according to claim 14, wherein said control portion includes a predefined delimiter indicating a boundary between two successive time sequences.

17. A node of a multi-hop packet network, wherein the node is connected to other nodes and is configured to schedule transmissions according to a time sequence, wherein the transmissions comprise a control portion reserved for transmission of at least one control packet and a data portion reserved for transmission of data packets, wherein the node is associated with a level of a plurality of levels, each level comprising nodes located a same number of hops from a first node, the number of hops measured along a shortest path between said first node and each other node in the network; and
   the node is scheduled to transmit delay sensitive traffic during a period whose location within the data portion depends at least on the levels between which the delay sensitive traffic is to be transmitted,
   wherein at least two periods are allocated for the node, a first period allocated for an uplink transmission direction and a second period allocated for a downlink transmission direction, wherein the uplink transmission direction is toward the first node and the downlink transmission direction is outward from the first node.

18. A node according to claim 17, wherein said control portion includes a predefined delimiter indicating a boundary between two successive time sequences.

19. A node according to claim 17, wherein at least two periods are allocated for the node, a first period allocated for a first transmission to a first node that is a fewer number of hops from the first node and a second period allocated for a second transmission to a second node that is a greater number of hops from the first node.

20. A node according to claim 17, wherein the multi-hop network is a mesh network.

21. A node according to claim 20, wherein the mesh network is a wireless mesh network.

22. A method of transmitting data packets in a multi-hop packet network including a plurality of interconnected nodes configured to schedule their transmissions through said one or more hops, the method comprising:

allocating at a first node a reservation period to a transmission between the first node and a second node based on a number of hops between the first node and a third node and between the second node and the third node in a network, wherein the network comprises a plurality of interconnected nodes, wherein the transmission comprises a data packet comprising delay sensitive traffic, and further wherein the number of hops is measured along a shortest path between the first node and the third node and between the second node and the third node in the network; and transmitting the data packet during the allocated reservation period, wherein transmissions include a first transmission between first neighboring levels in an uplink direction and a second transmission between second neighboring levels in a downlink direction, wherein the uplink direction is toward the first node and the downlink direction is outward from the first node.

23. A method according to claim 22, wherein the transmission further comprises a control portion that includes a predefined delimiter indicating a boundary between successive time sequences.

* * * * *